Jan. 10, 1956  F. H. RAHR  2,729,898
COLOR LOCATOR
Filed May 27, 1947

INVENTOR.
Frederic H. Rahr
BY
Ely & Frye
ATTORNEYS

United States Patent Office 2,729,898
Patented Jan. 10, 1956

2,729,898

COLOR LOCATOR

Frederic H. Rahr, New York, N. Y., assignor to The Sherwin-Williams Company, Cleveland, Ohio, a corporation of Ohio Application May 27, 1947, Serial No. 750,864

7 Claims. (Cl. 35—28.3)

This invention relates to means for selecting and matching colors. More particularly, this invention relates to means for quickly and accurately locating colors in a color directory.

It has been possible for the past decade or so for designers, interior decorators, colorists and the like to develop true and accurate color harmonies based upon actual schematic variation in hue and like color characteristics. The devices which have made such color harmonies possible are known as color directories and, in essence, comprise a compilation of cards showing substantially all possible variations in color possible with a palette of chromatic colors and achromatic black and white. In the form in which such color directories are usually available, the color cards are removably bound in loose-leaf fashion in series in which the color of each card varies with respect to an adjacent card by a predetermined degree of difference of one or more of the three fundamental color characteristics of hue, intensity or brilliance. [See the definition of "color" Merriam's "Webster's New International Dictionary" (2nd ed.)] By systematically arranging the several series in subgroups which were in turn arranged in larger groups, all the colors in the collection were classified according to their color characteristics.

The great advantage of such color directories was that, having selected with one or two of the desired colors in a desired color harmony, the systematic arrangement of the color cards enabled one to locate all the other colors called for in the desired harmony, assuming that the directory was sufficiently comprehensive to show all the significant tints, tones, and shades of the possible significant variations in a given hue. The back of each color card carried the formula showing the proper proportions of various paints, toners, and the like necessary to duplicate the color of the card. If one of the colors determined by use of the color directory was to be the color of a fabric used in an interior decorating color scheme, rather than the color of a paint, then the card could be removed from the directory and the properly colored fabric matched to it.

Despite the obvious advantages of such color directories, they have several shortcomings which, so far, have more or less limited their use to a relatively few color experts who, in the course of time, became familiar with a given directory. While a color directory required only the intelligence to read and understand the accompanying directions in order to develop a color harmony, once one had selected one or two of the colors on which the harmony was to be based, and although a painter could not fail to duplicate a selected color if he followed the mixing formula, the initial location of those one or two basic colors of the harmony was frequently extremely difficult. For example, assume that one desired to develop a color harmony in which the new colors of the walls, ceiling and drapery of a room were to harmonize with the colors of existing carpeting and furniture. Since it would be quite possible that such existing colors could not be exactly matched by a card, even in a very comprehensive directory, finding the one card in the directory of perhaps several thousand cards which most nearly matched one of the existing colors could be a difficult problem. In matching a card to the color of an object, due allowance must be made for the differences in surface textures and areas of the cards and the object being matched, the possible different angles of incident light, and other intangible but none the less real color distorting factors. Obviously, unless one were gifted with the ability or trained to judge colors according to their hue, intensity, and brilliance, the problem was frequently solved only by tedious trial and error, involving the selecting, withdrawing from the file, comparing, and then refiling numerous individual color cards.

While my invention is, in itself, a color directory and may be used as such, a primary object of this invention is to provide a locator by means of which even an inexperienced person can quickly and accurately locate the color card in a color directory which most nearly matches the color of a given existing surface.

Another advantage of my invention is that it permits the cards in a color directory to be filed compactly, as in a tray or box, and does not require that the cards be bulkily bound in separated groups or subgroups to permit location of a desired color. My color locator, therefore, not only permits a color directory to be used more accurately but allows the compilation of color cards to be physically less cumbersome and more easily used.

Another advantage of my locator is that the actual color chips are protected from soil and wear which would otherwise destroy its accuracy and usefulness.

Another advantage is that color harmonies are suggested by the arrangements of colors in a visual pattern, like colors nearest to and strong, contrasting colors farthest from any starting color point.

I achieve the several objects and advantages of my invention by arranging the color chips, not as in the prior card systems, in the order in which they vary with respect to each other as to only one color characteristic, but by the position the color chips would occupy if they could be physically arranged in the theoretical color solid which the entire gamut of color chips would define. By so arranging the color chips, as will be apparent from the following description of a preferred embodiment of my invention, matching to the nearest color in the directory is obtained by a vernier effect, and is thus extremely accurate.

Another advantage of a locator made according to my invention is that the distorting effect of differences in surface texture is minimized and the possible error due to different angles of incident light is eliminated.

Other objects and advantages of my invention will be apparent from the following specification, claims, and drawings, in which:

Figure 1:
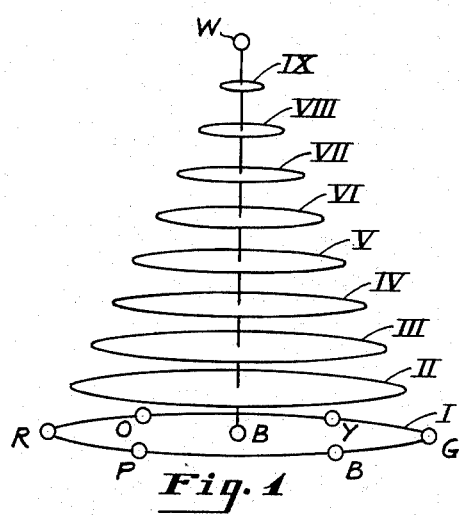
Fig. 1 is a diagrammatic showing of the color solid upon which the preferred embodiment of this invention is based.

In applicant's experience, the most satisfactory color directories developed to date are those based on a "Method of Obtaining a Color Gamut and Palette Therefor" as disclosed in the copending application of Carl E. Foss, Serial No. 734,911, filed March 15, 1947. Accordingly, the preferred embodiment is adapted to and embraces a directory of that type. Such a directory is based upon a color gamut or solid comprising a cone, as shown in Fig. 1, in which the base circle includes, on its periphery, the several chromatic hues of maximum intensity and, at its center, an achromatic black (or gray). Achromatic white is located at the apex of the cone. Since the geometry of the color solid is intended to show the proportional relationship of the colors in such a solid, it is apparent that in such a color solid, as shown in Fig. 1, all achromatic grays will be located on the axis of the cone, the proportion of white in a gray increasing as the position of the gray in the solid approaches the apex. Likewise, all hues of maximum intensity and containing no black or white will be located on the periphery of the base circle; gradients of such hues to black will be located in the base circle, an increased proportion of black locating the color nearer the center of the base circle; gradients of such hues to white will lie on elements of the conical surface, an increased proportion of white locating the color nearer the apex. All other colors within the gamut will lie within the conical color solid and contain proportions of achromatic black, white, and one or two of the chromatic primaries or color standards of maximum intensity located on the periphery of the base circle. The position of any such other color in the solid will be determined as follows: the distance of the color above the base circle will be directly proportional to the proportion of white, the distance of the color from the axis of the cone will be inversely proportional to the proportion of black, and the angular position around the axis will be determined by its chromatic content.

As pointed out in the above entitled copending application, the advantage of such a color solid is that it eliminates a great number of color chips of confusingly insignificant color differences while providing a gamut which may be effectively comprehensive.

To produce a finite color locator and directory based upon the above described color solid, I assume that all the integers of the color solid to be represented by color chips can be considered as lying in concentric circles, each circle being elevated above the base circle by a distance inversely proportional to its area. While the color chips which would lie in a given circle would not be of equal brilliance, as they would be if the well-known Helmholtz color solid were similarly divided into integers, they do have the desirable property, in so far as location of a color in the solid is concerned, of having an equal proportion of white.

Figure 2:
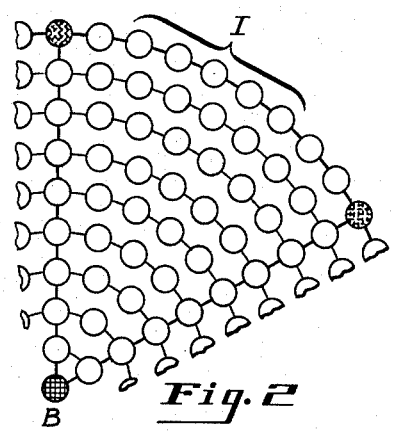
Fig. 2 is a fragmentary showing of the arrangement of color chips in the base circle of the color solid shown in Fig. 1.

In producing such a finite color locator, I have found that a comprehensive gamut, but without an excessively or confusing number of color chips, may be obtained by dividing the above described solid so that there are ten levels of white content, the base circle, designated as I, representing colors containing no white and the successive planes II to IX representing colors containing an increasing amount of white, the tenth level being pure white. To produce similar gradients between the hues of maximum saturation, yellow, green, blue, purple, red, and orange being indicated at the equal spaced points Y, G, B, P, R, and O on the base circle I, I provide color chips representing eight intermediate gradients between each pair of such hues, just as there are eight intermediate gradient planes between the base circle and the apex. Likewise, I provide color chips representing eight intermediate gradients between black and each of the maximum saturated hues, yellow, green, blue, etc. By mathematical progression, other colors in the base circle will be arranged as shown fragmentarily in Fig. 2, the total number of color chips in the base circle being 270 in number.

The color chips in the circle represented as II in Fig. 1 will be arranged similarly as in the base circle, except that, by mathematical progression due to the decreased areas of the circles, the number of color chips will be decreased by the number in the periphery of the base circle. By similar arrangement of chips and decrease in number according to the progression determined by the geometry of the solid, only seven chips will be represented in circle IX, a very light gray in the center and six off-whites on the periphery. The total number of chips in the solid will, including white, number exactly 1,000.

Figure 3:
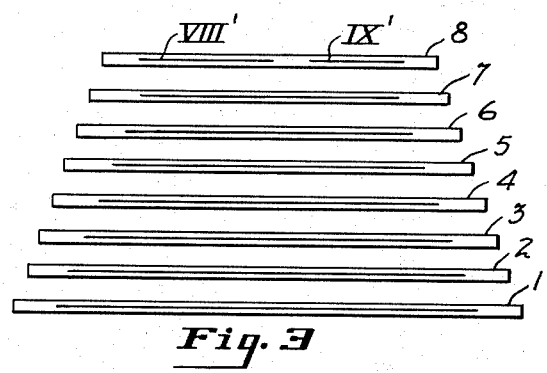
Fig. 3 is an end elevation of the several plates which comprise a color locator made according to this invention.
Figure 4:
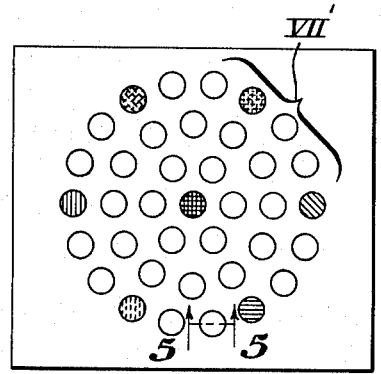
Fig. 4 is a plan view of one of the plates shown in Fig. 3.

To maintain the chips when so arranged in the color solid, I place them between laminated sheets of transparent material, to provide plates 1 to 8, as shown in Fig. 3 of the drawings. Because the color chips in levels VIII and IX are so relatively few in number, both sets of color chips may be incorporated in one plate, the position of the color chips of levels VIII and IX being indicated by the lines VIII' and IX'. A plan view of a typical plate (7) is shown in Fig. 4, indicating the arrangement of the color chips and showing the spacing between them.

Figure 5:
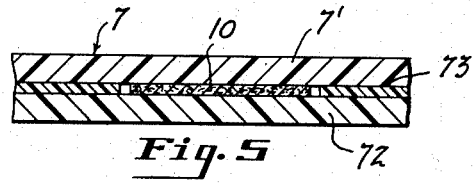
Fig. 5 is a greatly enlarged cross-sectional fragmentary detail taken along the line 5—5 of Fig. 4.

As shown in Fig. 5, a color chip 10 of the plate 7 may be simply frictionally held between the transparent sheets 71 and 72, which, adhered by the transparent adhesive 73, make up the plate 7. The sheets 71 and 72 may be of any suitable material having no appreciable visible light-absorbing characteristics when in thin sheets, such as the sheets 71 and 72. Because the several plates may be subjected to rough handling, the material is preferably light and resistant to fracture. A very suitable material having the requisite physical characteristics is polymerized methacrylate sheeting, such as is sold under the trade name "Plexiglas." The adhesive should, of course, have light-transmitting properties similar to those of the sheets 71 and 72; the partly polymerized methacrylate adhesive such as those sold under the trademark "Acryloid" are satisfactory.

Figure 6:
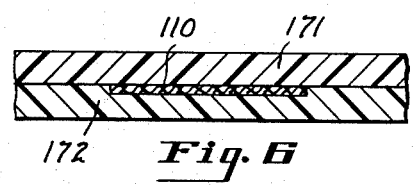
Fig. 6 is a modification of the construction of the plate as shown in Fig. 5.

Because it is sometimes desirable to employ color chips which are thicker than that shown in Fig. 5, and because it may also be advantageous to laminate the transparent sheets without an appreciable thickness of adhesive, the plates making up my locator may be modified as shown in Fig. 6 by recessing one of the pair of sheets 171 and 172 to provide recesses in which the color chips 110 are received. As indicated in Fig. 6, the particular color chip 110 is shown as being of fabric; such fabric color chips may be preferable, where the plates are intended to be used primarily in matching to fabrics.

Figure 7:
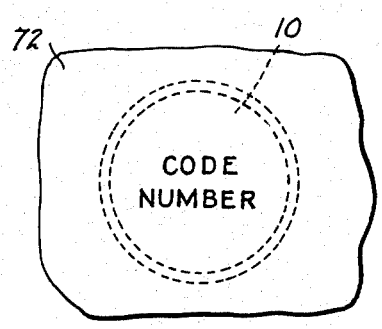
Fig. 7 is a bottom view of the fragmentary detail as shown in Fig. 5, but applicable, except for the reference characters, to the modification shown in Fig. 6.

As indicated in Fig. 7, the backs of the color chips are preferably provided with a code number referring to a color card of similar color in a conventional card type of color directory or to a formula book in which the paint mixing formula for duplicating the color of the chip may be printed. In most embodiments of my invention the color chip is usually only about a square inch in area and thus is not large enough to carry the information which is ordinarily printed on the back of the conventional color cards.

To use the above described color locator to find which color card in a corresponding card-type of color directory most nearly matches the color of a given surface, a general estimate of the lightness of color of the surface should enable one to select the proper plate of the locator. In any event, it is simple to determine whether one has selected the proper plate by successively laying a plurality of plates on the surface. It is seldom necessary to compare more than two or three plates to determine which plate contains the matching color chip.

Once the proper plate has been selected, and that takes but a moment, the eye will determine immediately the color chip which most closely matches the underlying surface. Just as the markings on a vernier scale direct the eye to the opposed pair of markings which are in alignment, so in my color locator the color chips which do not match the underlying surface direct the eye to the matching color chip. Because the underlying surface will be parallel to the matched chip, possible mismatching due to a difference in the angle of incident light to the chip and the surface is eliminated. Due to the contrast between the matched chip and the unmatched chips, the distorting effect of differences in surface texture between the chip and the underlying surface is also greatly minimized.

While my color locator as specifically described is designed for use with a conventional card-style of directory book on the color solid shown in Fig. 1, it should be apparent that it may be modified to include an arrangement of color chips based upon a differently configured color solid. My invention, therefore, is not to be understood to be limited to the specific embodiment disclosed.

What is claimed is:

1. A color locator for locating the most closely matching color card in a color directory comprised of a plurality of colors varying as to each other according to the three fundamental color characteristics comprising a set of plates of laminated sheets of material which is substantially equally transparent to all wave bands of visible light and color chips included between the laminae of each plate and spaced from each other, each of said color chips in the set of plates corresponding to a color card in the color directory in conjunction with which the set of plates is to be used and the color chips in each of the several plates being arranged as they would lie on an intersecting surface if the color chips were arranged as integers of the color solid represented by the color cards and the solid were intersected by a number of surfaces equal to the number of plates in the set.

2. A color directory comprising a set of plates comprised of laminated sheets of material which is substantially equally transparent to all wave bands of incident daylight and color chips, held between said laminated sheets and spaced from each other, said color chips arranged with respect to each other as though all the color chips in the color directory were integers of the color solid represented by said color chips and were lying in spaced planes corresponding in number to the number of said plates.

3. Means for locating the color chip in a color directory which most nearly matches the color of an article, which means comprises a plate of material transparent to incident visible light without appreciable absorption of any wave band, spaced chromatic color chips carried by said plate and grouped about a central achromatic color chip in such a manner that the achromatic components of said chips is inversely proportional to the distance from the central achromatic chip, said chips varying angularly as to hue about said achromatic chip and all said chips, including said achromatic chip, having an equal, if any, white content, whereby, when said plate is placed upon a colored surface, the contrast between the surface beneath the plate and the chips of unlike color indicates the chip most like the color of the surface.

4. In a color locator, a plurality of groups of color chips, each arranged and carried as defined in claim 3, the color chips in each group having a substantially equal white content and each group differing from other groups by a difference in white content.

5. A color locator as defined in claim 4, in which the number of chips in each group decreases substantially inversely proportionately to the increase in white content of the chips in the group, whereby a substantially constant significant color difference is maintained between adjacent chips in all groups.

6. A color locator for locating color chips in a color directory based upon a conical color solid in which the chromatic hues of maximum intensity and variants therebetween are located on the periphery of the base circle of the cone, white is located at the apex of the cone, black is located at the center of the base circle, said cone being intersected by planes parallel to the plane of the base circle, said locator comprising groups of spaced color chips carried by transparent plastic plates, said groups being arranged in circular form and the chips thereof arranged and varying as to each other as they would be arranged in the planes, including the base circle, intersecting the color solid, the different groups corresponding to different planes.

7. A color directory comprising a set of plates of transparent material which exhibits substantially no absorption of wave bands of incident visible light and chromatic and achromatic color chips carried by said plates and arranged in groups of chromatic color chips spaced about an achromatic color chip, the color chips of one group differing from the color chips of any other group by a difference in white content, the chromatic color chips in any one group being further arranged about the achromatic chip thereof so that said chromatic color chips exhibit variations, as to hue and shading, of colors of substantially equal white content.

References Cited in the file of this patent

UNITED STATES PATENTS

| | | |
|---|---|---|
| 1,400,552 | Howland | Dec. 20, 1921 |
| 1,597,830 | Rueger | Aug. 31, 1926 |
| 1,598,899 | Vogel | Sept. 7, 1926 |
| 1,704,605 | Hintze | Mar. 5, 1929 |
| 1,871,078 | Nash | Aug. 9, 1932 |

OTHER REFERENCES

Color to Order, Scientific American, May 1946, pp. 219–220.